US008548446B2

(12) United States Patent
Morel (10) Patent No.: US 8,548,446 B2
(45) Date of Patent: Oct. 1, 2013

(54) DEVICE FORMING A SHARED TELEPHONE ADDRESS BOOK, ASSOCIATED TELEPHONE TERMINAL AND METHOD

(75) Inventor: Marc Morel, Bievres (FR)

(73) Assignee: Bouygues Telecom, Boulogne-Billancourt (FR)

( * ) Notice: Subject to any disclaimer, the term of this patent is extended or adjusted under 35 U.S.C. 154(b) by 1243 days.

(21) Appl. No.: 11/641,238

(22) Filed: Dec. 18, 2006

(65) Prior Publication Data

US 2008/0153466 A1  Jun. 26, 2008

(30) Foreign Application Priority Data

Dec. 19, 2005 (FR) ...................... 05 12912

(51) Int. Cl.
*H04M 3/42* (2006.01)
(52) U.S. Cl.
USPC ............... 455/414.2; 455/566; 455/456.1; 455/456.6; 455/412.2; 455/419

(58) Field of Classification Search
USPC ............... 455/414.2, 556, 412.2, 419, 456.6, 455/456.1
See application file for complete search history.

(56) References Cited

U.S. PATENT DOCUMENTS

| | | | |
|---|---|---|---|
| 6,374,100 B1 | 4/2002 | Smith et al. | |
| 2002/0116396 A1* | 8/2002 | Somers et al. | 707/200 |
| 2002/0156895 A1* | 10/2002 | Brown | 709/226 |
| 2004/0092254 A1 | 5/2004 | Henrick | |
| 2006/0046768 A1* | 3/2006 | Kirbas | 455/550.1 |

FOREIGN PATENT DOCUMENTS

| | | |
|---|---|---|
| WO | WO 00/01132 | 1/2000 |
| WO | WO 2004/015965 | 2/2004 |

* cited by examiner

*Primary Examiner* — Kamran Afshar
*Assistant Examiner* — Shahriar Behnamian
(74) *Attorney, Agent, or Firm* — Blakely Sokoloff Taylor & Zafman (57) ABSTRACT

A device for forming a shared telephone address book is provided. The device may be associated with a mobile telephony terminal to form a shared telephone address book also provided is a method for sharing contacts.

19 Claims, 4 Drawing Sheets

DEVICE FORMING A SHARED TELEPHONE ADDRESS BOOK, ASSOCIATED TELEPHONE TERMINAL AND METHOD

The area of the invention is the area of telephony and more specifically the area relating to the sharing of contact cards memorized in telephone address books.

The invention concerns a device forming a shared telephone address book, a telephony terminal and a method allowing the sharing of contact cards between several telephony terminals.

By <<contact card>>, is meant an electronic visiting card giving information of the type name, address, telephone number, e-mail address, etc. As a non-limiting example of a contact card format, mention may be made of the <<vCard>>format (acronym for <<Virtual Card>>).

Telephony is evolving from a traditional model in which all the members of one same home use a single telephone terminal, towards a new model in which each member of the home has his or her own telephony terminal, in particular a mobile telephony terminal. One consequence of this new model is the disappearance of the family address book in which information on a contact can be consulted by each and everyone.

The terminal of a member of the home has a personal telephone address book memorizing both personal contacts particular to this member and also <<common>> contacts (family, public bodies, etc.) which are potentially of use to all the members of the home.

As a result <<common>> contacts are stored heteroclite fashion on the different terminals of the members of the home. The terminal of a first member may perhaps have in memory the contact details of a common contact, while the terminal of a second member does not have this contact entry.

It would therefore be desirable to have the possibility to reproduce the equivalent of a family address book to allow the second member to have access to information on a common contact held by the first member.

Evidently, said desire is not limited to the family circle, and is expressed more generally within a group of persons wishing to share contacts, e.g. on professional level.

Techniques have been put forward to allow the exchange of contact cards. These entail transmitting a contact card from one terminal to another for example, even synchronizing the telephone address books of two terminals (by synchronization is meant a process consisting of identifying the differences between the telephone books and solving these differences by merging the content into a single version of the telephone book).

However, these techniques require setting up a direction connection between two telephony terminals.

Contact exchange is therefore limited to the two connected terminals, and does not extend to all the persons in the group concerned (e.g. all the members of the home). It does not therefore relate to contact sharing among all the members of the group concerned.

Also, these direct connection techniques have accompanying security problems, e.g. of virus transfer type from one terminal to the other.

The invention sets out to propose a technique overcoming these shortcomings which allows the automatic sharing, between the different persons of a group, of the contact cards stored heteroclite fashion on the different terminals of the group members.

For this purpose, and according to a first aspect, the invention proposes a device forming a shared telephone book, comprising wireless communication means able to set up a connection with a telephony terminal located in the vicinity of the device in a coverage area of said wireless communication means, the terminal comprising a personal telephone book memorizing contact cards and having means to connect with said wireless communication means, the device being characterized in that it also comprises:
  means for storing contact cards;
  means for making available, to each terminal connected to the device, the contact cards stored in the storage means of said device for incorporation of said cards into the personal address book of each terminal.

Some preferred, but non-limiting, aspects of this device are the following:
  it comprises means for importing into said storage means the contact cards memorized in the personal telephone book of each terminal connected to the device;
  the storage means comprise means for associating a terminal identifier with each imported contact card, to identify the terminal from which the card is imported;
  a contact card is imported into said storage means if it is memorized in the telephone book of a terminal connected to the device and is indicated therein as being a public contact card;
  the contact cards imported into the storage means from a terminal connected to the device are stored therein permanently;
  the contact cards stored permanently are made available with an identifier of the device;
  the contact cards imported from a terminal into the storage means are stored therein temporarily during the connection time of said terminal with the device;
  the contact cards stored temporarily are made available with the associated terminal identifier.

According to a second aspect, the invention proposes a telephony terminal comprising a personal telephone book memorizing contact cards and having connection means adapted to ensure the connection of said terminal with a device according to the first aspect of the invention, when the terminal is in the coverage area of the wireless communication means of said device, characterized in that it comprises means for incorporating in said personal address book the contact cards made available by said device.

Some preferred, but non-limiting, aspects of this device are the following:
  the incorporating means also allow sorting to be made between the contact cards made available by the device and the contact cards memorized in the personal address book so as to eliminate any duplicates;
  the terminal also comprises means for memorizing a contact card made available by the device in the personal telephone book;
  the terminal also comprises means for exporting towards the device the contact cards memorized in the personal telephone book, said exported cards then being made available to each terminal connected to the device;
  the terminal comprises means enabling a user to indicate which contact cards memorized in the personal telephone book are to be made public for exporting towards the device;
  the terminal comprises means enabling a user to indicate which public contact cards can be exported towards the device to be stored permanently therein;

According to a further aspect, the invention proposes a method for sharing contact cards among several telephony terminals, characterized in that it comprises the steps consisting of:
  providing a device according to the first aspect of the invention;

placing a terminal according to the second aspect of the invention in the coverage area of the wireless communication means of the device, so as to set up a connection between the device and the terminal;

as soon as the connection is set up, making available to the terminal those contact cards stored in the device, for the incorporation of said cards into the personal telephone book of the terminal.

Other aspects, purposes and advantages of the present invention will become better apparent on reading the following detailed description of preferred embodiments thereof, given by way of example and not limiting, with reference to the appended drawings in which.

Figure 1:
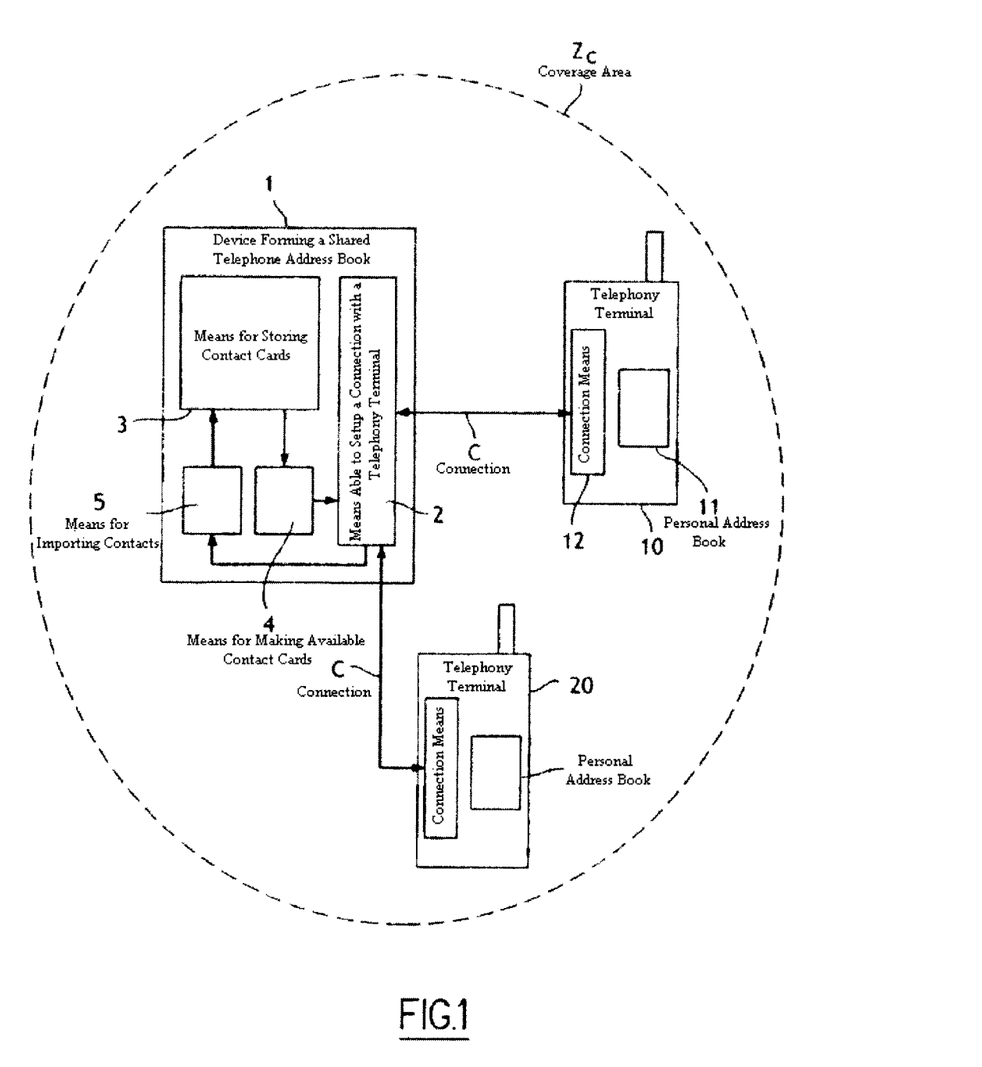
FIG. 1 shows a assembly formed of a device according to a first aspect of the invention and of two terminals according to the second aspect of the invention, present in the coverage area of the wireless communication means of the device and connected to the device.

With reference to FIG. 1, a device 1 is shown forming a shared telephone book according to the first aspect of the invention.

This device comprises wireless communication means 2 able to set up a connection with telephony terminals 10, 20 located in the vicinity of device 1 within a coverage area Zc of said wireless communication means.

Each terminal 10, 20 for this purpose is provided with short range connection means 12.

Each terminal also comprises means (not shown), which are conventional means, able to set up a communication with a communication network.

The telephony terminals 10, 20 may be land-line or cell terminals; the communication network respectively being a wire network (of public switched telephone network type—PSTN) or a cell network (of GSM type).

When a terminal 10, 20 enters a coverage zone Zc of the communication means 2 of device 1, a wireless connection is automatically set up between the device and the terminal.

Said wireless connection is based for example on one of the technologies WiFi, Bluetooth, wireless USB or UWB.

Purely by way of illustration, the communication means 2 of device 1 are a WiFi and/or Bluetooth radio for example, and the connection means 12 of the telephony terminals also comprise a WiFi and/or Bluetooth radio.

The connections represented by the double arrows C, provided the terminals 10, 20 and the device 1 are previously configured accordingly, then operate according to their radio connection mode.

As examples, for a Bluetooth radio, the BD_ADDR address is taken into account, and for the WiFi radio the MAC address of the telephone's wifi card is used.

To obtain the first connection of a terminal to the device 1, it is possible to make provision for a button on the device which the user must press to place the device in standby for a new identifier.

With a Bluetooth radio, the user of the terminal enters a pin code to validate the connection. This code may be given in the document of the device for example, or engraved on the underside of the casing which receives the device.

With a WiFi radio, the user enters the IP address of the device. This address may also be supplied by the WiFi router that is utilized.

It will be noted that this identification/pairing part is based on market standards and is not specific to the invention.

The device comprises power supply means (not shown) e.g. a battery supply or a mains supply (via a transformer).

Under a preferred application of the invention, the device forming a shared address book is in the form of a self-standing unit arranged in a location common to the different persons concerned by the sharing of contact cards. In a family setting, this unit is placed in the home.

Evidently, the device forming a self-standing shared address book, may also be integrated in any type of equipment, intended to be placed in said common location.

The telephony terminals 10, 20 each comprise a personal telephone book 11 in which contact cards are memorized.

This telephone book 11 contains contact cards stored in the terminal and also optionally, when the terminal can also receive a SIM card, the contact cards stored in said SIM card.

Device 1 comprises storage means 3 for contact cards. As will be described below, the storage means 3 may also be adapted to associate a status with a contact card and optionally the original terminal from which said card was taken.

The storage means 3 are also adapted to store identifiers of the terminals of the group of persons concerned by contact sharing. By way of example, in a family application, the storage means 3 store the identifiers of the mobile terminals of the family members.

Together with the identifier of an authorized terminal, the storage means 3 may also store the status (absent/present) of said terminal.

Therefore, when a terminal enters a coverage area Zc of the device 1, a first step consists of identifying the terminal, by comparing the identifier presented by the terminal to the device, with the identifiers stored in the device.

The storage of data in the storage means 3 of device 1 may be made in the form of flat files, e.g. two flat files, one containing the authorized terminals under consideration, and the other the contacts in the form of a sequence of contact cards (e.g. vCard string).

Storage may also be made in the form of a database comprising two tables for example linked via the terminal identifiers.

The device 1 also comprises means 4 for making available, to each terminal 10, 20 connected to the device, the contact cards stored in the storage means 3 of said device for the incorporation of said cards into the personal address book 11 of each terminal 10, 20.

Therefore, when a terminal 10 present in the coverage area Zc is recognized (identified) by the device, the wireless connection is set up between the terminal 10 and the device 1 and the contact cards stored in the storage means 3 of device 1 are made available to terminal 10 for incorporation into the personal address book 11 of terminal 10.

The contact cards made available by the device being incorporated in the personal address book 11 of the terminal, these contact cards then become accessible to the user of terminal 10 in the same manner as the personal contact cards already memorized in the personal address book 11 of the terminal.

In other words, the address book of a terminal connected to the device automatically becomes enriched with the different contact cards stored on the device 1 forming a shared telephone address book.

The terminal 10 is advantageously provided with means, software means in particular, adapted to conduct sorting between the contact cards made available by device 1 and the personal contact cards already memorized in the personal address book 11 of the terminal. This sorting is provided in particular in order to eliminate any duplicating between the contact cards derived from the device 1 and the personal contact cards.

Figure 2:
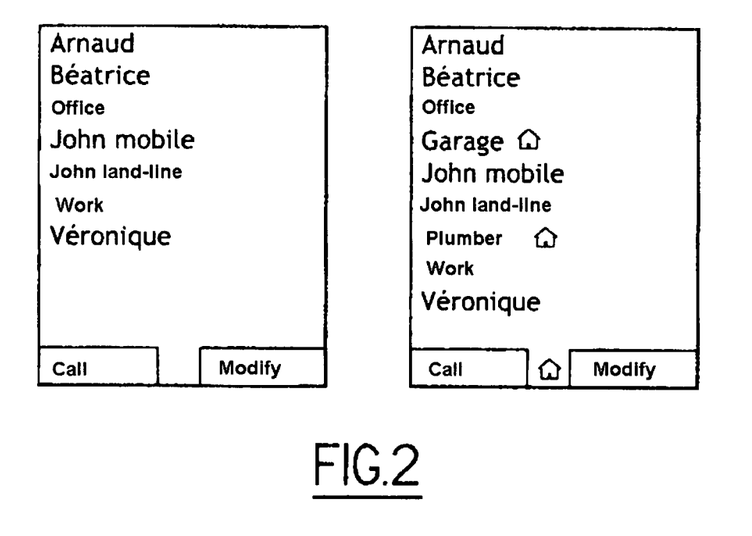
FIGS. 2 and 3 are examples of display of a personal telephone book of a terminal connected to the device according to the first aspect of the invention.

On the left side of FIG. 2 the display is shown of the personal address book of terminal 10 when this terminal is not connected to the device 1. In this case, solely the personal contact cards are displayed.

On the right side of FIG. 2 the display is shown of the personal address book of terminal 10 when this terminal is connected to the device 1. In this case, the contact cards of the device 1 are incorporated (optionally after sorting as mentioned above) in the personal address book of terminal 10. The contact cards derived from the device are therefore displayed with the personal contact cards.

In the example shown here, the contact cards <<Garage>> and <<Plumber>> are cards derived from device 1 and are incorporated in the personal address book of terminal 10.

Advantageously, the contact cards derived from the device may be displayed so as to be differentiated from the personal contact cards, e.g. (cf. FIG. 2) by associating a special icon therewith.

The contact cards derived from device 1 in the personal address book 11 of terminal 10 are preferably stored in a working memory of terminal 10.

Provision may also be made for these contact cards to be memorized in a storage memory of terminal 10, e.g. a memory of Flash type.

So that the terminal is able to continue to function properly when it enters the coverage area Zc of device 1, provision may be made for the contact cards derived from device 1 to be incorporated not in a block but progressively. For example, to prevent the connection time with the device forming a shared address book from slowing down the functioning of the terminal, it may be provided that exchanges between the terminal and the device (see FIGS. 5 and 6 in particular) are made asynchronously and not in a manner blocking use of the terminal.

By way of example, a user who immediately displays his/her address book on arriving in the coverage area of the device forming a shared address book, will not necessarily see the new contacts appearing immediately. The new contacts will gradually come to build up the terminal's address book as and when transfers are made, and during this time the user can use his/her terminal normally (for phoning in particular).

The terminal may also comprise means for memorizing a contact card made available by the device in its personal telephone book. The user of terminal 10 can therefore make a copy of a contact card derived from device 1 in the personal telephone book 11 of said terminal 10. In other words, it is possible to make a local copy, in the personal address book of terminal 10, of those contacts derived from the device forming a shared address book 1.

When the terminal 10 leaves the coverage area Zc and therefore disconnects from device 1, the contact cards derived from device 1 (which were not locally copied into the personal address book during the connection time) no longer appear in the personal address book.

According to a first embodiment, the contact cards derived from the device are deleted (from the working memory or from the storage memory of Flash type) when terminal 10 disconnects from device 1.

According to another embodiment, the contact cards derived from the device are no longer displayed but nevertheless remain stored in the terminal 10 to allow for quicker reincorporating when the terminal again connects to the device 1.

Preferably, the device 1 may also comprise means 5 for importing into the storage means 3 those contact cards that are memorized in the telephone book 11 of each terminal 10, 20 connected to the device.

It is to be noted here that the means 4 for making contacts available and the importing means 5 may be grouped in one same processing unit, able in particular to determine at any time which terminals are present in the coverage area Zc and which contact cards are made available by these terminals.

The means 5 may also be adapted so that the status of a contact card is also imported and stored in the storage means together with said contact card. This status indicates for example, as is detailed below, whether it is a private contact card (not public), a permanent public contact card or a temporary public contact card.

Provision may be made so that the importing of a contact card into the storage means 3 of device 1 is only possible if said card is memorized in the telephone book 11 of terminal 10, 20 connected to device 1 and is indicated as being a public contact card. Alternatively, a private contact card may be imported into device 1, but it will not be made available to the other terminals.

By default, provision may be made for a user to share all his/her personal contact cards. A contrario, the default setting may be for no personal card to be shared.

The terminal may also comprise means, in particular software means, adapted to allow the user to indicate which contact cards he/she wishes to make public and which cards are not to be shared.

The imported public contact cards are then made accessible to all the connected terminals, in the same manner as the contact cards stored in the storage means of the device 1.

A contact card imported into the storage means 3, from a terminal 10,20 connected to device 1, can be stored therein permanently. In said case, this contact card will not appear in the connected terminals as being derived from a terminal but as derived from the device 1.

As a variant, a contact card imported from a terminal into the storage means 3 may be stored therein temporarily, during the connection time of said terminal to the device 1. When the terminal disconnects from the device, the contact card imported from said terminal 10 is then no longer made available to the other terminals 20 via device 1. In particular, said imported contact card can be deleted from the storage means 3.

By default, provision may be made for all the personal contact cards labelled as public to be stored temporarily in the storage means 3 of the device. A contrario, the default provision is that the public personal cards imported into the device are stored therein permanently.

The terminal may also comprise means, in particular software means adapted to allow the user to indicate which of the public contact cards are to be imported into the device 1 and made permanently available to the other terminals, and those which are only to be imported and made temporarily available.

Figure 3:
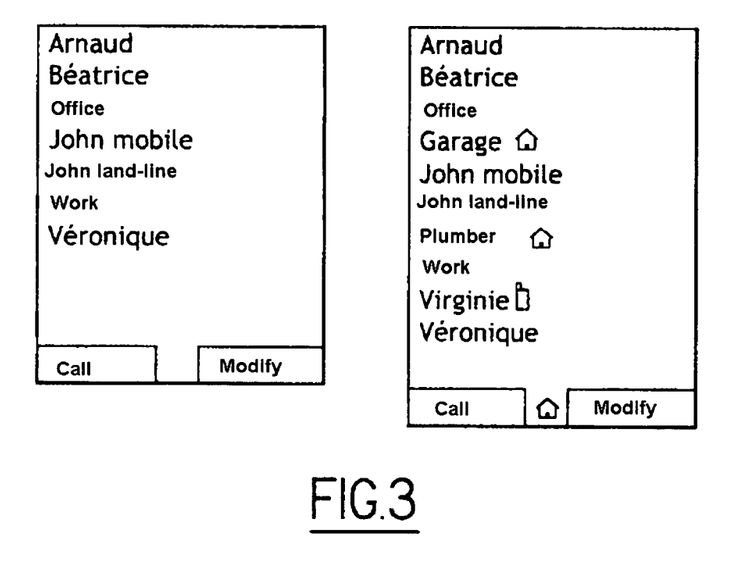

On the left in FIG. 3, the display of the personal address book of terminal 10 is shown, when this terminal is not connected to the device 1. In this case, solely the personal contact cards are displayed.

On the right in FIG. 3, the display of the personal address book of terminal 10 is shown, when this terminal is connected to the device 1, another terminal 20 also being connected to the device 1. In FIG. 3, a contact card of the other terminal 20 (<<Virginie>> card) is public.

The contact cards stored in the device 1 are incorporated into the personal address book 11 of terminal 10. Similarly, the contact cards imported into the device from said other terminal 20 are also incorporated in the personal address book 11 of terminal 10.

These contact cards derived from the device and from said other terminal are then displayed with the personal contact cards. In the example shown here, the contact cards "Garage" "Plumber" are cards stored permanently in the device 1, while the "Virginia" card is a public card derived from said other terminal via the device 1.

Advantageously, and similarly to the above description regarding FIG. 2, the contact cards derived from device 1 may be displayed in a manner so that they can be differentiated from the personal contact cards, e.g. (cf. FIG. 3) by associating a special icon with the cards stored permanently in the device and a special icon for the cards derived from another terminal (in this latter case, provision may be made to use one single icon for all the terminals sharing one or more contacts; it is also possible to associate an icon with each terminal sharing a contact).

It will have been understood from the above that the invention allows the transmitting and pooling of contact cards either temporarily or permanently between two terminals, without these terminals having to set up a direct connection with each other. With the invention, it is therefore possible to achieve a <<virtual>> connection via the device forming a shared address book between several terminals simultaneously.

Figure 4:
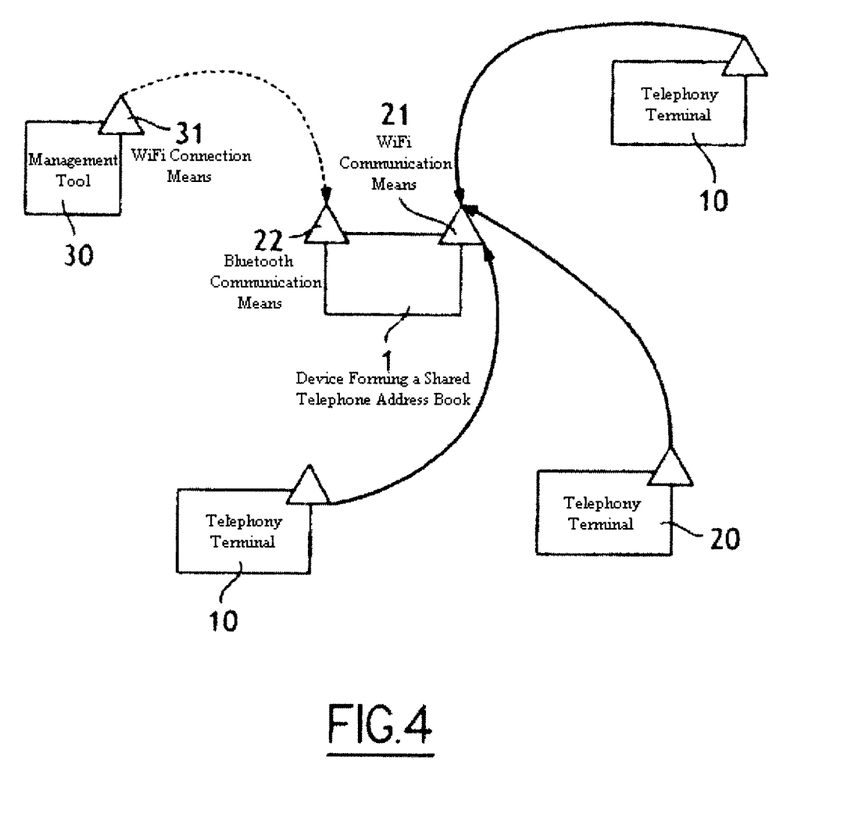
FIG. 4 shows a variant of the assembly in FIG. 1.

According to one optional embodiment, a management tool 30 (e.g. of personal computer type) may be associated with the device in order to simplify the management of said device. For example this may entail using the management tool to simplify management of the contact cards e.g. by enabling a contact card to be deleted or added via the management tool. It may also entail simplified management of users i.e. identifiers of the terminals concerned by contact card sharing and with whom the device is likely to set up a connection.

As shown FIG. 4, the device 1 comprises both wireless communication means of WiFi type 21 and wireless communication means of Bluetooth type 22. The management tool 30 comprises connection means of WiFi type 31 to set up a communication according to this standard with the device 1. The terminals 10, 20 communicate with the device via the Bluetooth link and may be of land-line terminal type 20 or cell terminal type 10.

Figure 5:
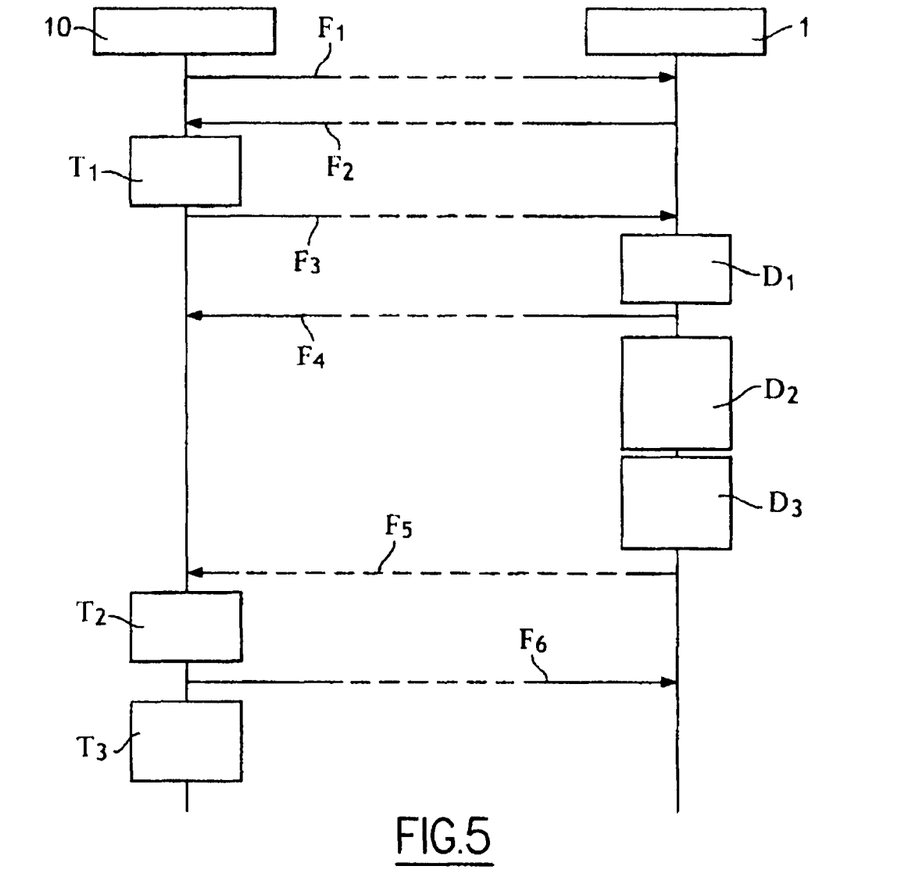
FIG. 5 illustrates exchanges between a terminal according to the second aspect of the invention and the device according to the first aspect of the invention, and the operations conducted at terminal and device level relating to establishing a connection between the terminal and the device.
Figure 6:
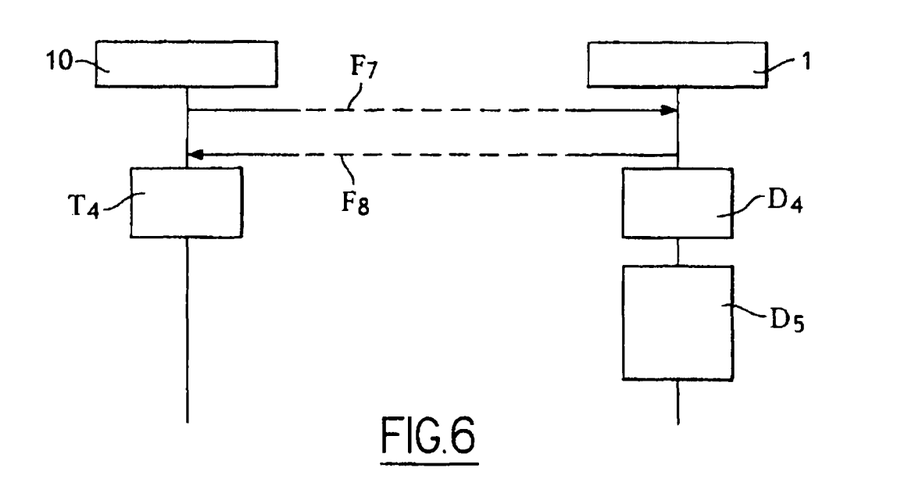
FIG. 6 illustrates the exchanges between a terminal according to the second aspect of the invention and the device according to the first aspect of the invention, and the operations conducted at terminal and device level relating to terminating the connection between the terminal and the device.

FIG. 5 shows a possible embodiment of the method according to the invention, regarding the establishing of a connection between the terminal 10 and the device 1. FIG. 6 shows a possible embodiment of the method of the invention regarding the termination of a connection between the terminal 10 and the device 1. In these figures, the arrows represent the exchanges between the terminal and the device, while the blocks represent the operations conducted at terminal or device level.

With reference to FIG. 5, the terminal 10 sends a request for connection (arrow $F_1$) to the device 1. In reply to this request, the device 1 indicates to terminal 10 that it authorizes this connection (arrow $F_2$).

At block $T_1$, terminal 10 identifies contacts to be shared. It indicates these contacts to the device (arrow $F_3$). At block $D_1$, the device receives the contacts derived from terminal 10 and notifies the terminal of receipt of these contacts (arrow $F_4$).

At block $D_2$, the device conducts a search for duplicates between the contacts stored permanently and the contacts stored temporarily in its storage means 3. At block $D_3$, the device sends the new contacts to the other connected terminals.

Terminal 10 therefore receives new contacts (block $T_2$), derived (cf. arrow $F_5$) from the device and from the other terminals that are connected (via the device). More precisely, the terminal 10 receives <<owner/contact>> pairs. At block $T_2$, terminal 10 acknowledges receipt of these new contacts, and at block $T_3$, it updates its address book with the newly received contacts thereby enriching (temporarily or permanently) its own address book.

With reference now to FIG. 6, terminal 10 sends a request for disconnection (arrow $F_7$) to the device 1. In reply to this request, the device 1 indicates to the terminal 10 that it authorizes this disconnection (arrow $F_8$).

At block $T_4$, the terminal deletes the temporary contacts received when it was connected to the device. For its part, the device at block $D_4$ deletes the temporary contacts received from terminal 10 during connection therewith, and at block $D_5$, the device requests the other connected terminals to delete from their address book the temporary contacts derived from terminal 10 which is henceforth disconnected.

The invention claimed is:

1. A device (1) for forming a shared telephone address book comprising:
    a wireless communication means (2) which sets up a connection with a plurality of telephony terminals (10) located in a coverage area (Zc) of said wireless communication means, each telephony terminal (10) including:
    a personal telephone book (11) which memorizes contact cards;
    a connection means (12) which connects said telephony terminal with said wireless communication means (2) when said telephony terminal is within said coverage area;
    a storage means (3) for storing contact cards and identifiers of the plurality of telephony terminals whose contact cards are memorized by the personal telephone book of each of said plurality of telephony terminals;
    a means (4) for making available, to said plurality of telephony terminals (10) once the plurality of telephony terminals (10) are wirelessly connected to the device, the contact cards stored in the storage means (3) of said device (1) for incorporation of said contact cards into the personal address book (11) of the plurality of the telephony terminals (10); and
    a means (5) for automatically importing, into said storage means (3), contact cards memorized in the personal telephone book (11) of the plurality of the telephony terminals (10) once the telephony terminal (10) is in the coverage area (Zc),
    wherein each personal telephone book (11) when wirelessly connected to the device is automatically loaded with contact cards from the storage means by operation of said means for making available.

2. The device of claim 1, wherein the storage means (3) comprises:
    a means for associating with each imported contact card an identifier of one of the plurality of telephony terminals from which each imported contact card is imported.

3. The device of claim 2, wherein a contact card is imported into said storage means if it is memorized in the telephone book (11) of one of the plurality of telephony terminals connected to the device and is designated therein as being a public contact card.

4. The device of claim 1, wherein the contact cards imported into the storage means (3) from the plurality of telephony terminals connected to the device are stored therein permanently.

5. The device of claim 4, wherein the contact cards stored permanently are made available with an identifier of the device.

6. The device according to claim 2, wherein the contact cards imported from the plurality of telephony terminals into the storage means (3) are stored temporarily therein during the connection time of said telephony terminals (10) with said device (1).

7. The device according to claim 6, wherein the contact cards stored temporarily are made available with the identifier of the associated telephony terminal.

8. A telephony terminal (10, 20) comprising:
a personal telephone book (11) that memorizes contact cards;
a connection means (12) which connects said telephony terminal with said wireless communication means 2 when said telephony terminal is within said coverage area;
a means for incorporating, into said personal book, the contact cards made available by the device, wherein the device (1) includes:
a storage means 3 for storing contact cards and identifiers of the plurality of telephony terminals whose contact cards are memorized by the personal telephone book of each of said plurality of telephony terminals;
a means (4) for making available, to said plurality of telephony terminals (10) once the plurality of telephony terminals (10) are wirelessly connected to the device, the contact cards stored in the storage means (3) of said device (1) for incorporation of said contact cards into the personal address book (11) of the plurality of the telephony terminals (10); and
a means (5) for automatically importing, into said storage means (3), contact cards memorized in the personal telephone book (11) of the plurality of the telepony terminals (10) once the telephony terminal (10) is in the coverage area (Zc),
wherein each personal telephone book (11) when wirelessly connected to the device is automatically loaded with contact cards from the storage means by operation of said means for making available.

9. The telephony terminal of claim 8, wherein said incorporating means sorts between the contact cards made available by the device and the contact cards memorized in the personal book to eliminate duplicates.

10. The telephony terminal (10, 20) according to either claim 8 or claim 9, further comprising:
a means for memorizing, in the personal telephone book, a contact card made available by the device.

11. The telephony terminal of claim 8, further comprising:
a means for exporting the contact cards memorized in the personal telephone book to the device (1) forming a shared telephone address book, wherein the device includes a wireless communication means (2) for setting up a connection with the telephony terminal (10) when the telephony terminal is located in the vicinity of the device in a coverage area (Zc) of said wireless communication means;
a personal telephone book (11) which memorizes contact cards and has a connection means (12) to connect with said wireless communication means (2).

12. The terminal of claim 11, further comprising:
a means for enabling a user to indicate which contact cards memorized in the personal telephone book can be made public for exporting to the device.

13. The terminal of claim 12, further comprising:
a means for enabling a user to indicate which public contact cards intended to be exported to the device can be stored therein permanently.

14. A method for sharing contact cards between a plurality of telephony terminals, comprising:
providing a device (1) which forms a shared telephone address book, wherein the device includes:
a wireless communication means (2) which sets up a connection with a plurality of telephony terminals (10) located in a coverage area (Zc) of said wireless communication means, each telephony terminal (10) including:
a personal telephone hook (11) which memorizes contact cards;
a connection means (12) which connects said telephony terminal with said wireless communication means (2) when said telephony terminal is within said coverage area;
a storage means (3) for storing contact cards and identifiers of the plurality of telephony terminals whose contact cards are memorized by the personal telephone book of each of said plurality of telephony terminals;
a means (4) for making available, to said plurality of telephony terminals (10) once the plurality of telephony terminals (10) are wirelessly connected to the device, the contact cards stored in the storage means (3) of said device (1) for incorporation of said contact cards into the personal address book (11) of the plurality of the telephony terminals (10); and
a means (5) for automatically importing, into said storage means (3), contact cards memorized in the personal telephone book (11) of the plurality of the telephony terminals (10) once the telephony terminal (10) is in the coverage area (Zc),
wherein each personal telephone book (11) when wirelessly connected to the device is automatically loaded with contact cards from the storage means by operation of said means for making available.

15. The method of claim 14, further comprising:
memorizing a contact card made available by the device in the personal telephone book of the telephony terminals.

16. The method of claim 14, further comprising:
exporting to the device the contact cards memorized in the personal address book of the telephony terminals.

17. The method of claim 16, further comprising:
indicating, for a terminal user, which contact cards memorized in the personal address book can be made public for exporting to the device.

18. The method of claim 16, further comprising:
storing, in the storage means of the device, the contact cards imported from the telephony terminals connected to the device.

19. The method of claim 18, further comprising:
indicating, for a terminal user which public contact cards intended to be exported to the device can be stored therein permanently.

* * * * *

UNITED STATES PATENT AND TRADEMARK OFFICE
CERTIFICATE OF CORRECTION

PATENT NO.         : 8,548,446 B2                                      Page 1 of 1
APPLICATION NO.    : 11/641238
DATED              : October 1, 2013
INVENTOR(S)        : Marc Morel It is certified that error appears in the above-identified patent and that said Letters Patent is hereby corrected as shown below:

In the Claims, Column 9, Claim 8, line 20, please delete "means 2" and insert --means (2)--.

Signed and Sealed this
Tenth Day of December, 2013

Margaret A. Focarino
*Commissioner for Patents of the United States Patent and Trademark Office*